United States Patent
Funck et al.

(10) Patent No.: US 11,973,377 B2
(45) Date of Patent: Apr. 30, 2024

(54) PROCESS FOR APPLYING FIBER-REINFORCED PLASTIC SLEEVES

(71) Applicant: Albany Engineered Composites, Inc., Rochester, NH (US)

(72) Inventors: Ralph Funck, Kaiserslautern (DE); Jens Jung, Kaiserslautern (DE); Martin Welsch, Henschtal (DE)

(73) Assignee: Albany Engineered Composites, Inc., Rochester, NH (US)

(*) Notice: Subject to any disclaimer, the term of this patent is extended or adjusted under 35 U.S.C. 154(b) by 81 days.

(21) Appl. No.: 17/724,429

(22) Filed: Apr. 19, 2022

(65) Prior Publication Data

US 2022/0344989 A1 Oct. 27, 2022

Related U.S. Application Data

(60) Provisional application No. 63/178,781, filed on Apr. 23, 2021.

(51) Int. Cl.
| | |
|---|---|
| *H02K 15/12* | (2006.01) |
| *H02K 1/278* | (2022.01) |
| *H02K 1/28* | (2006.01) |
| *H02K 15/03* | (2006.01) |

(52) U.S. Cl.
CPC ............ *H02K 1/28* (2013.01); *H02K 1/278* (2013.01); *H02K 15/03* (2013.01); *H02K 15/12* (2013.01)

(58) Field of Classification Search
CPC ........... H02K 1/28; H02K 1/278; H02K 15/03
USPC ....................................................... 310/156.28
See application file for complete search history.

(56) References Cited

U.S. PATENT DOCUMENTS

| | | | | |
|---|---|---|---|---|
| 6,047,461 | A * | 4/2000 | Miura | H02K 21/12 310/156.28 |
| 6,452,301 | B1 * | 9/2002 | Van Dine | H02K 1/2773 310/156.12 |
| 6,960,856 | B2 * | 11/2005 | Reimann | H02K 5/128 310/156.28 |
| 2003/0182787 | A1 * | 10/2003 | Nilson | H02K 1/2726 29/598 |
| 2004/0070306 | A1 * | 4/2004 | Gysin | H02K 1/278 310/156.28 |
| 2006/0226724 | A1 * | 10/2006 | Cullen | H02K 1/278 310/156.31 |
| 2013/0062984 | A1 * | 3/2013 | Tremelling | H02K 1/30 310/156.28 |

(Continued)

FOREIGN PATENT DOCUMENTS

| | | |
|---|---|---|
| DE | 10 2007 037326 A1 | 2/2009 |
| DE | 10 2014 220699 A1 | 5/2016 |

(Continued)

OTHER PUBLICATIONS

EP 0996212 A1—Machine Translation (Year: 2000).*

(Continued)

*Primary Examiner* — Tran N Nguyen
*Assistant Examiner* — Masoud Vaziri
(74) *Attorney, Agent, or Firm* — McCarter & English, LLP

(57) ABSTRACT

Disclosed is a method and a system for pretensioning fiber-reinforced plastic (FRP) sleeves surrounding an assembly of parts. The method includes application of pretensioning FRP sleeves surrounding a permanent magnet rotor with surface magnets.

17 Claims, 7 Drawing Sheets

(56) References Cited

U.S. PATENT DOCUMENTS

2019/0036430 A1\* 1/2019 Takano ................. H02K 1/278

FOREIGN PATENT DOCUMENTS

| DE | 10 2015 002093 A1 | 8/2016 | | |
|----|----|----|----|----|
| DE | 10 2016 211 308 A1 | 12/2017 | | |
| EP | 0996212 A1 \* | 4/2000 | ............ | H02K 15/03 |
| EP | 1 223 662 A1 | 7/2002 | | |
| EP | 1 385 253 A1 | 1/2004 | | |
| EP | 2 091 131 A1 | 8/2009 | | |
| FR | 2768271 A1 \* | 3/1999 | ............ | H02K 1/278 |
| WO | WO 2019/052835 A1 | 3/2019 | | |

OTHER PUBLICATIONS

FR-2768271-A1 Machine Translation (Year: 1999).\*
International Search Report and Written Opinion prepared by European Patent Office, acting as the International Searching Authority, for international application PCT/US2022/025430 dated Jul. 22, 2022.

\* cited by examiner

PROCESS FOR APPLYING FIBER-REINFORCED PLASTIC SLEEVES

CROSS-REFERENCE TO RELATED APPLICATION

This application claims the benefit of priority of U.S. Provisional Patent Application Ser. No. 63/178,781 filed Apr. 23, 2021. The foregoing application is incorporated herein by reference in its entirety.

BACKGROUND

1. Field of the Disclosure

The invention relates to a method for applying fiber-reinforced plastic (FRP) sleeves. In particular, the method includes application of FRP sleeves to an assembly of parts such as a permanent magnet rotor under pretension.

2. Related Art

Permanent magnet (PM) rotors with surface magnets have become established in the field of rotors for high-speed machines. The surface magnets can be rare earth permanent magnets, which are usually applied to the rotor shaft by gluing. The speed range of such rotors may be high, exceeding 10,000 revolutions per minute.

To ensure the functionality of a high-speed PM rotor, fiber-reinforced plastic (FRP) sleeves are used, among other things, to exert a radial compressive force on the magnets and tend to inhibit the magnets from detaching at high speeds. The radial compressive force or the pretensioning of a sleeve is achieved by pressing the sleeve or by winding fibers under prestress on the surface magnets. In most applications, such FRP sleeves are designed to suit the material. That is, the continuous fibers lie in the circumferential direction, as a result of which the tangential stresses occurring during the operation of the rotor are effectively absorbed by the sleeve. The wall thickness of the FRP sleeve depends on the acting tangential stresses and the axially acting compressive force when the sleeve is pressed onto the surface magnets. Due to the tangential fiber orientation, a FRP sleeve may have a low axial compressive strength, which means that it is difficult to press on thin-walled sleeves.

SUMMARY

The present invention concerns a method of pretensioning a fiber-reinforced plastic (FRP) sleeve surrounding an assembly. The method comprises disposing the assembly within the FRP sleeve, the assembly having at least two parts; introducing a molding compound into at least one portion within the FRP sleeve to urge one of the at least two parts of the assembly toward an inner surface of the FRP sleeve, the molding compound introduced at a desired first pressure (P), first temperature (T), and first mass flow ($\dot{m}$); and pretensioning the FRP sleeve by hardening the molding compound while maintaining the first pressure.

In certain embodiments, the assembly is a permanent magnet (PM) rotor and the at least two parts are a surface magnet mounted on a rotor and concentric with an axis of rotation of the rotor.

In certain embodiments, the portion within the FRP sleeve is a first cavity to receive the molding compound, the first cavity being circumferential and located between the PM rotor and an inner surface of the surface magnet.

In some embodiments, another portion within the FRP sleeve is a second cavity that is circumferential and located between the surface magnet and the FRP sleeve; and the method comprises introducing the molding compound into the second cavity to urge one of the at least two parts of the assembly toward an inner surface of the FRP sleeve, the molding compound introduced at a desired second pressure (P), second temperature (T), and second mass flow ($\dot{m}$); and hardening the molding compound while maintaining the second pressure.

In other embodiments, a portion within the FRP sleeve is a first cavity to receive the molding compound, the first cavity being circumferential and located between an outer surface of the surface magnet and an inner surface of the FRP sleeve.

In certain embodiments, the pretension is sufficient to oppose a rotational force on the surface magnet based on a rotational speed of the PM rotor.

In some embodiments, the method further comprises disposing the assembly and FRP sleeve in a fixture, the fixture configured to provide a conduit to the at least one portion and configured to provide a circumferential gap between the sleeve and fixture prior to introduction of the molding compound; removing the assembly from the fixture after hardening of the molding compound; and detaching a sprue from the at least one portion.

In certain embodiments, the method further comprises disposing the assembly and FRP sleeve in a fixture, the fixture configured to provide a first conduit to the first cavity and a second conduit to the second cavity and comprising a circumferential gap between the FRP sleeve and fixture prior to introduction of the molding compound; removing the assembly from the fixture after hardening of the molding compound; detaching a first sprue from the first cavity; and detaching a second sprue from the second cavity, and the pretension is sufficient to oppose a rotational force on the surface magnet based on a rotational speed of the PM rotor.

In further embodiments, the molding compound is selected from the group consisting of thermoplastic and thermosetting plastic.

In certain embodiments, the molding compound is selected from the group consisting of unreinforced, short fiber reinforced, and long fiber reinforced molding compounds, and combinations thereof.

In some embodiments, the molding compound is introduced by a process selected from the group consisting of injection molding and resin injection.

In certain embodiments, torque is transmitted from the surface magnet to a shaft of the rotor by a method selected from the group consisting of: a force fit, a positive connection, and combinations thereof between the rotor shaft and at least one surface magnet or molding compound.

In further embodiments, the FRP sleeve has a wall thickness between 0.1 mm to 2 mm.

In some embodiments, the FRP sleeve has a fiber volume content of 50% to 75%.

In certain embodiments, the FRP sleeve comprises a matrix material with continuous fibers being arranged at an angle of 80 degrees to 90 degrees to a longitudinal axis of the sleeve.

In certain embodiments, the rotor shaft comprises a metallic material.

In other embodiments, the molding compound is disposed on additional portions of the assembly selected from the group consisting of: end faces of the assembly, above the surface magnet, below the surface magnet, and on an outside surface of the FRP sleeve.

The present invention further concerns a permanent magnet rotor assembly. The permanent magnet rotor assembly comprises a permanent magnet (PM) rotor; at least one surface magnet on the PM rotor; a fiber-reinforced plastic (FRP) sleeve; and a molding compound. The PM rotor and at least one surface magnet are disposed within the FRP sleeve, and the molding compound induces a pretension in the FRP sleeve.

In certain embodiments, the pretension is sufficient to oppose a rotational force on the surface magnet based on a rotational speed of the PM rotor.

BRIEF DESCRIPTION OF THE DRAWINGS

The accompanying drawings, which are included to provide a further understanding of the invention, are incorporated in and constitute a part of this specification. The drawings presented herein illustrate different embodiments of the invention and together with the description serve to explain the principles of the invention. In the drawings.

DETAILED DESCRIPTION

Figure 1A:
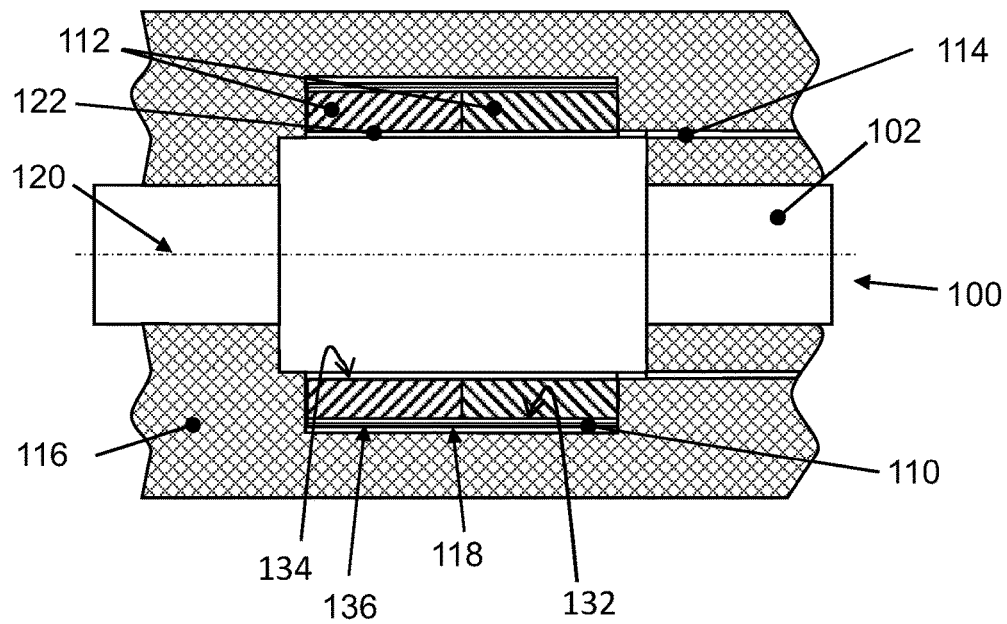
FIGS. 1A-1E illustrate a first embodiment of the method of prestressing a FRP sleeve surrounding a permanent magnet rotor having a surface magnet.

Terms "comprising" and "comprises" in this disclosure can mean "including" and "includes" or can have the meaning commonly given to the term "comprising" or "comprises" in U.S. Patent Law. Terms "consisting essentially of" or "consists essentially of" if used in the claims have the meaning ascribed to them in U.S. Patent Law. Other aspects of the invention are described in or are obvious from (and within the ambit of the invention) the following disclosure.

The terms "threads", "fibers", and "yarns" are used interchangeably in the following description. "Threads", "fibers", and "yarns" as used herein can refer to monofilaments, multifilament yarns, twisted yarns, multifilament tows, textured yarns, braided tows, coated yarns, bicomponent yarns, as well as yarns made from stretch broken fibers of any materials known to those ordinarily skilled in the art. Fibers can be made of carbon, nylon, rayon, fiberglass, cotton, ceramic, aramid, polyester, metal, polyethylene glass, and/or other materials that exhibit desired physical, thermal, chemical or other properties.

"Pretension", "pretensioning force", "prestress", and grammatical variations thereon mean a force applied by a sleeve, such as a fiber-reinforced plastic sleeve, to an object enclosed by the sleeve and can include a "compressive radial force" and a "centripetal force". The terms "compressive radial force" and "centripetal force" are used interchangeably to mean a force that acts on a body moving in a circular path and directed toward the center around which the body is moving.

The terms "fiber-reinforced plastic sleeve" and "FRP sleeve" are used interchangeably to mean a tubular structure comprising fibers, such as continuous fibers, embedded in a matrix compound. Fiber-reinforced plastic also is known as fiber-reinforced polymer. Sleeves include thin-walled sleeves as described herein.

For a better understanding of the invention, advantages and objects attained by its uses, reference is made to the accompanying descriptive matter in which non-limiting embodiments of the invention are illustrated in the accompanying drawings and in which corresponding components are identified by the same reference numerals.

As described in more detail herein, the disclosed method includes pretensioning a fiber-reinforced plastic sleeve that surrounds an assembly of parts, the sleeve maintaining the parts in a desired location. The sleeve may be pretensioned by injecting a molding material in locations within the sleeve. Some examples of locations for injecting of molding material include, but are not limited to:

(i) between an inner portion of the assembly and an inner surface of the sleeve to urge surface parts of the assembly against an inner surface of the sleeve, or (ii) between an outer surface of the assembly and an inner surface of the sleeve to urge parts of the assembly together, or (iii) between both an inner portion of the assembly and an inner surface of the sleeve, and between an outer surface of the assembly and an inner surface of the sleeve.

The molding material may be comprised of any one or combinations of short fiber reinforced, long fiber reinforced, or unreinforced molding compound. An injection molding process or resin injection process can be used to introduce the molding material, but any known method is contemplated.

Examples of molding materials that may be used include thermoplastic compounds, thermosetting compounds, or other compounds having desired thermal, chemical, and/or mechanical properties. Examples of suitable thermoplastic compounds include polypropylene (PP), polyamide (PA), acrylonitrile butadiene styrene (ABS), polyethylene imine (PEI), polyphthalamide (PPA), polyphenylene sulfide (PPS), polyaryletherketone (PAEK), polyetherketoneketone (PEKK), and polyetheretherketone (PEEK). Examples of suitable thermosetting compounds include duroplastic compounds, epoxy (EP), cyanate ester (CE), bismaleimide, vinyl-ester.

The pretensioned sleeve can apply a force to keep the parts of the assembly in the desired position. The sleeve can be comprised of continuous fibers embedded in a matrix material. The matrix material may include a plastic material, which may differ from the plastic material of the sleeve and the plastic material of the molding as well as the fiber, can include thermosetting or thermoplastic materials or combinations thereof. Examples of suitable thermosetting materials include epoxy (EP), cyanate ester (CE), bismaleimide, and vinyl-ester. Examples of suitable thermoplastic materials include polypropylene (PP), polyamide (PA), acrylonitrile butadiene styrene (ABS), polyethylene imine (PEI), polyphthalamide (PPA), polyphenylene sulfide (PPS), polyaryletherketone (PAEK), polyetherketoneketone (PEKK), and polyetheretherketone (PEEK). A continuous fiber may be a single fiber or a bundle of fibers that originate at, e.g., an angle of 80 degrees to 90 degrees to a longitudinal axis of the sleeve. A continuous fiber is in contrast to a discontinuous fiber, such as a chopped fiber or broken stretched carbon fiber. The continuous fibers in the sleeve may be arranged at an angle of 80 degrees to 90 degrees to a longitudinal axis of the sleeve. The sleeve can have a wall thickness between 0.1 mm to 2 mm. In other embodiments, the sleeve may have a fiber volume content of 45% to 75%.

In a particular application, the disclosure provides a method for applying a FRP sleeve to a permanent magnet rotor assembly having one or more surface magnets. The sleeves are pretensioned to apply a force to maintain the surface magnets in a desired position on the rotor. Pretensioning force of the sleeves can be adjusted by the amount and pressure of molding injected. The pretensioned sleeves can apply a centripetal force sufficient to counteract rotational forces on the surface magnets during operation and maintain the surface magnets in the desired position on the rotor.

The disclosure is explained in more detail below on the basis of exemplary embodiments as applied to a permanent magnet rotor assembly having surface magnets FIGS. 1A-1E illustrate steps of an implementation of the present method of prestressing a FRP sleeve 110 surrounding a permanent magnet rotor 100 (rotor) having at least one surface magnet 112. The permanent magnet rotor includes a rotor shaft 102. The rotor and surface magnet may be concentric about a rotational axis 120, the rotational axis congruent with a longitudinal axis of the sleeve.

FIG. 1A illustrates a first method step in which the FRP sleeve 110 may be disposed to surround the permanent magnet rotor 100 and at least one surface magnet 112. The sleeve can be hollow and substantially concentric about the rotational axis. The sleeve can be comprised of fibers embedded in a plastic material. Typically, the fibers may be continuous. The FRP sleeve with rotor and magnets is disposed in a molding fixture 116 adapted to retain the FRP sleeve with rotor and magnets. The molding fixture 116 is designed to provide at least one circumferential gap 118 between an outer surface 136 of the FRP sleeve 110 and the molding fixture 116 and at least one circumferential conduit 114. Conduit 114 can provide access to a circumferential cavity 122 located between the rotor and an inner surface 134 of surface magnets 112.

Figure 1B:
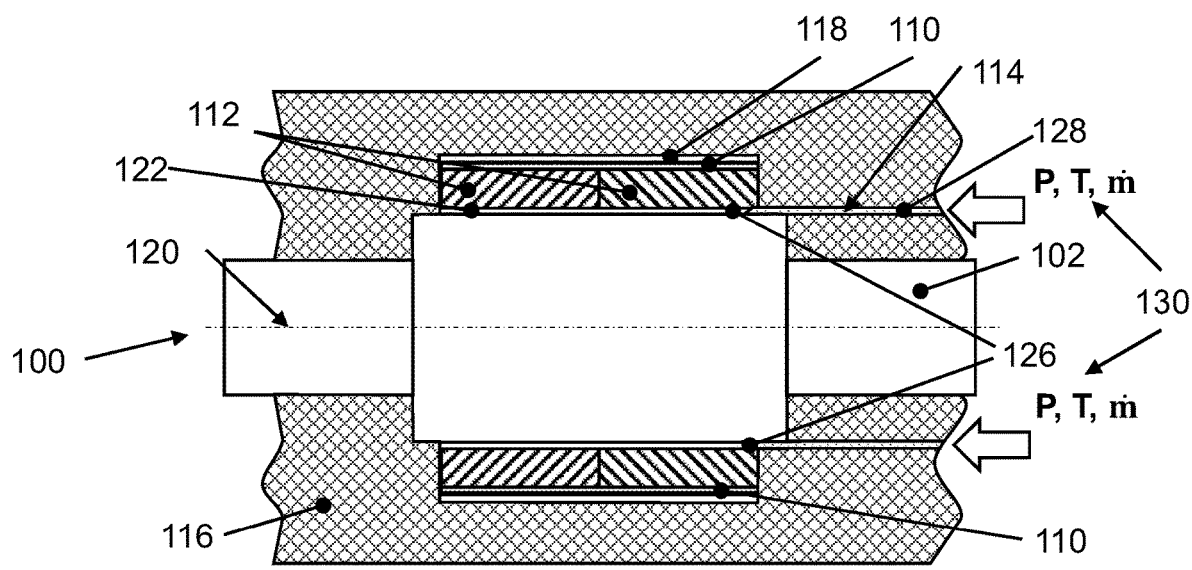
Figure 1C:
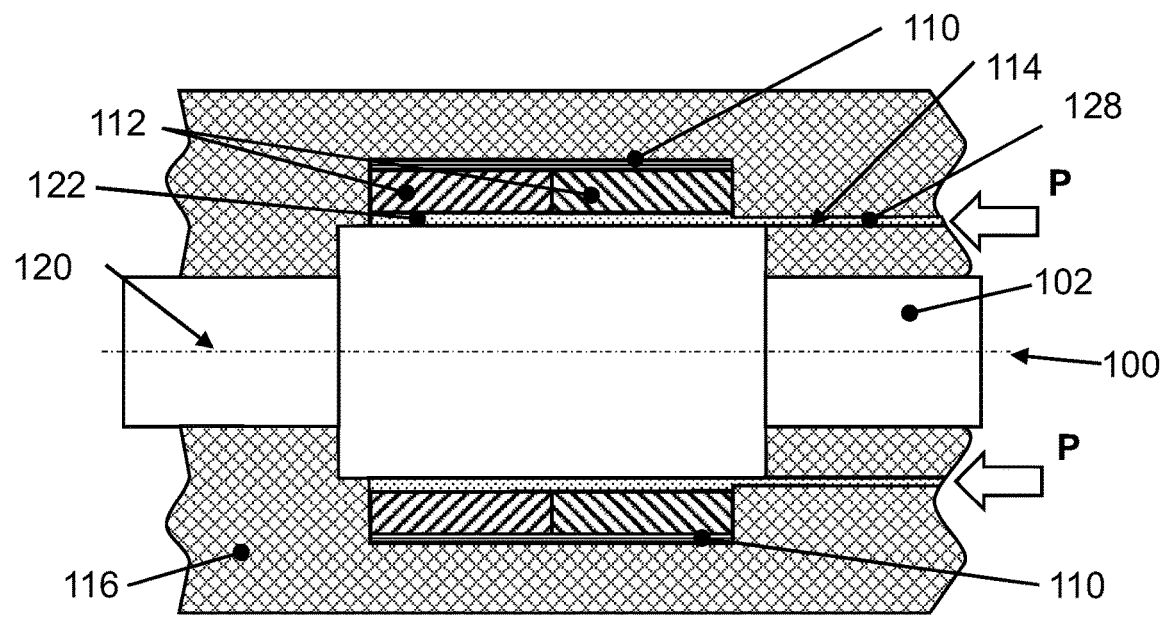

FIG. 1B illustrates a second method step in which a molding compound 128 can be introduced into the molding fixture 116 through conduit 114 by a defined mass flow (ṁ) under pressure (P) and temperature (T) as indicated by arrows 130. The flow front 126 of the molding compound progresses through the conduit as the molding compound 128 is introduced. The molding compound 128 can be a thermoplastic, thermosetting compound (such as a duroplastic compound), or other compound having desired thermal, chemical, and/or mechanical properties.

FIG. 1O illustrates a third method step in which the molding compound 128 has advanced through conduit 114 and filled cavity 122 between the rotor and surface magnet 112. Pressure P of the molding compound can urge surface magnet 112 outward to increase a width of cavity 122 and reduce a width of gap 118. Pressure of the molding compound can cause the surface magnets to press against the FRP sleeve. As such, the sleeve can be pretensioned and apply a radial compressive force acting on surface magnet 112. In the prestressed state, hardening of the molding compound can occur under pressure P. In this way, the pretension may remain in the hardened state of the molding compound. "Hardening" includes "setting", "cooling", and other such terms as may be used depending on the chemical, thermal, and mechanical characteristics of the molding compound being introduced. "Introduction" of the molding compound includes injecting the compound by any known means.

Figure 1D:
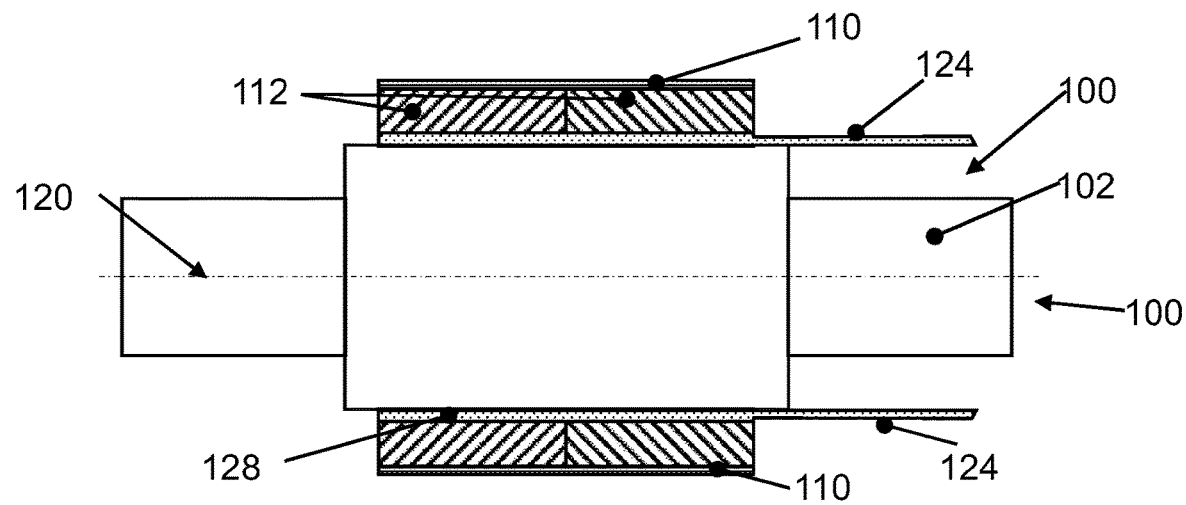
Figure 1E:
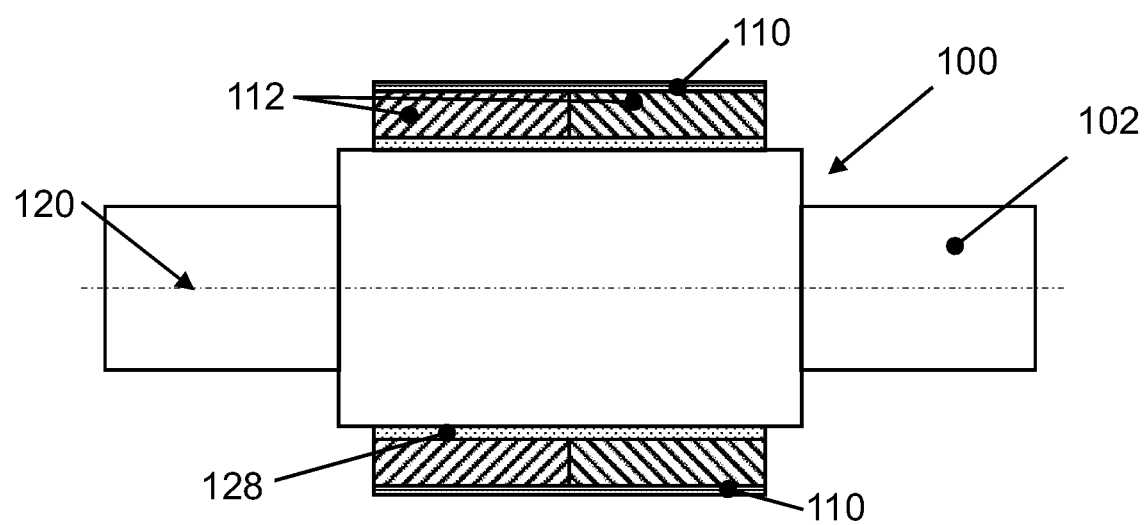

FIG. 1D illustrates a fourth method step in which the permanent magnet rotor 100 is removed from the molding fixture 116 and having the protruding sprue 124 of the molding compound 128 in conduit 114. FIG. 1E illustrates a fifth method step with the protruding sprues removed and the resultant permanent magnet rotor 100 with surface magnet 112 pretensioned by FRP sleeve 110 available for further process steps.

Figure 2A:
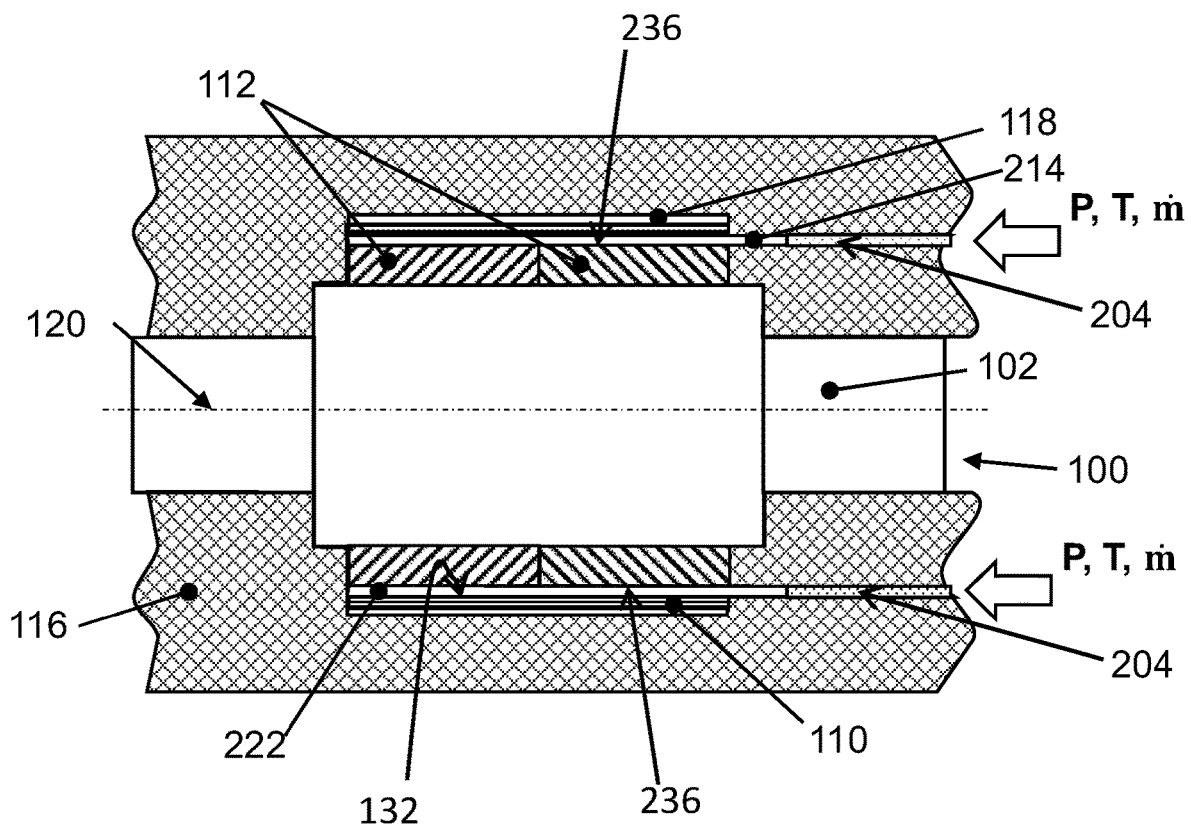
FIGS. 2A-2C illustrate a second embodiment of the method of prestressing a FRP sleeve surrounding a permanent magnet rotor having a surface magnet.
Figure 2B:
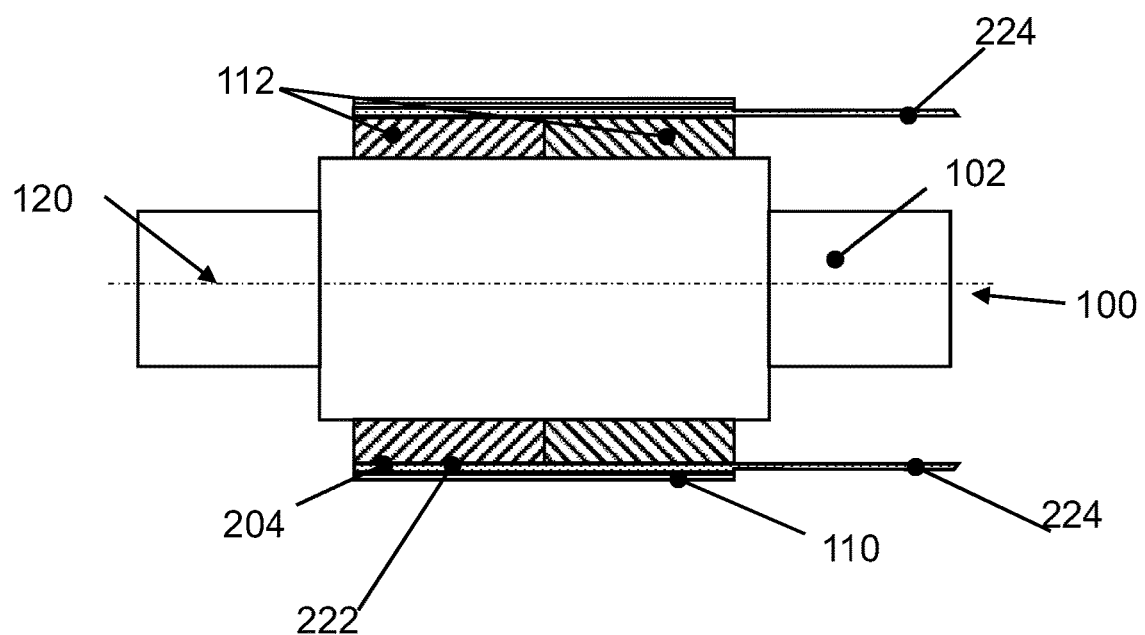
Figure 2C:
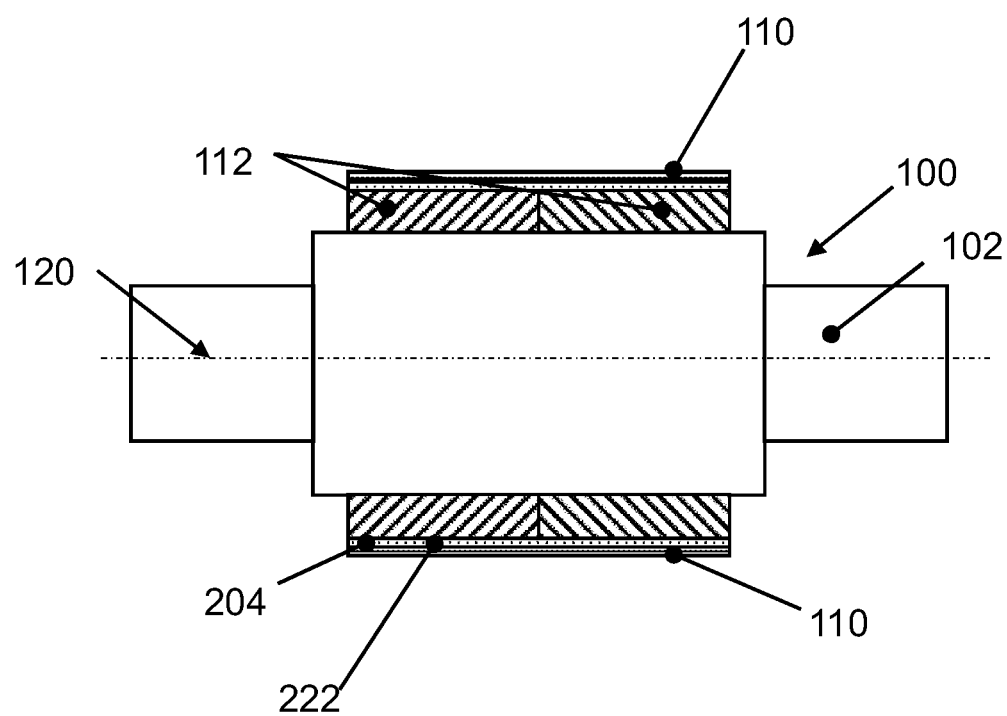

FIGS. 2A-2C illustrate steps of another implementation of the present method of prestressing a FRP sleeve 110 surrounding a permanent magnet rotor 100 (rotor) having at least one surface magnet 112. The permanent magnet rotor having a rotor shaft 102. The rotor and surface magnet may be concentric about a rotational axis 120.

FIG. 2A illustrates a first method step in which the FRP sleeve 110 is disposed to surround the permanent magnet rotor 100 and at least one surface magnet 112. The sleeve can be hollow and substantially concentric about the rotational axis. The sleeve can be comprised of fibers embedded in a plastic material. Typically, the fibers may be continuous. The FRP sleeve with rotor and magnets is disposed in a molding fixture 116 adapted to retain the FRP sleeve with rotor and magnets. The molding fixture 116 is designed to provide at least one circumferential gap 118 between the FRP sleeve 110 and the molding fixture 116 and at least one circumferential conduit 214. The conduit 214 can provide access to a circumferential cavity 222 between the outer surface 236 of the surface magnets 112 and an inner surface of the sleeve 132.

Similar to that described above with respect to FIG. 1B, a second method step may be performed in which a molding compound 204 can be introduced into the molding fixture 116 through conduit 214 by means of a defined mass flow (ṁ) under pressure (P) and temperature (T). The molding compound 204 can be a thermoplastic, thermosetting compound (such as a duroplastic compound), or other compound having desired thermal, chemical, and/or mechanical properties.

Similar to that described above with respect to FIG. 1O, a third method step may be performed in which the molding compound 204 advances through conduit 214 and fills cavity 222 between the outer surface 236 of surface magnet 112 and inner surface 132 of sleeve 110. Pressure P of the molding compound 204 can urge sleeve 110 outward, expanding the sleeve and reducing a width of gap 118. As such, expansion of the sleeve can pretension the sleeve and apply a radial compressive force acting on surface magnet 112. In the prestressed state, hardening of the molding compound can occur under pressure P. In this way, the pretension may remain in the hardened state of the molding compound.

FIG. 2B illustrates a fourth method step in which the permanent magnet rotor 100 is removed from the molding fixture 116 and having protruding sprue 224 of the molding compound 204 in conduit 214. FIG. 2C illustrates a fifth method step with the protruding sprue removed and the resultant permanent magnet rotor 100 with surface magnet 112 pretensioned by FRP sleeve 110 available for further process steps.

Figure 3A:
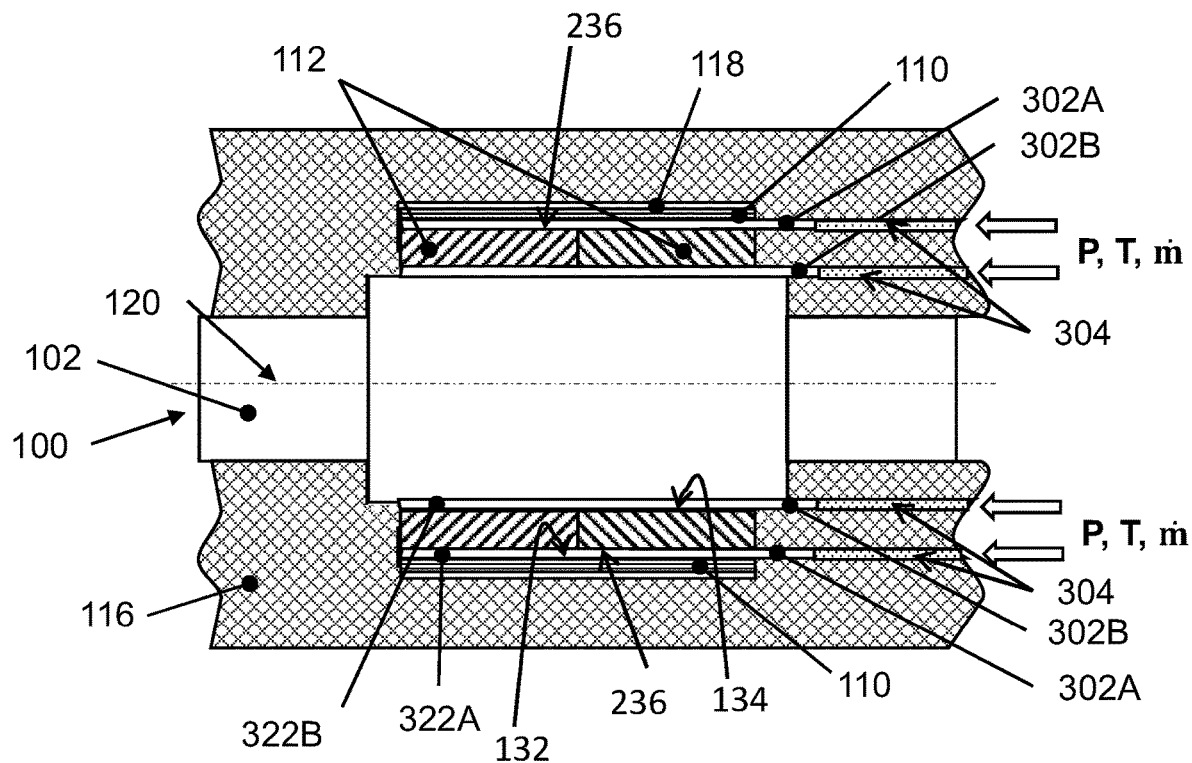
FIGS. 3A-3C illustrate a third embodiment of the method of prestressing a FRP sleeve surrounding a permanent magnet rotor having a surface magnet.
Figure 3B:
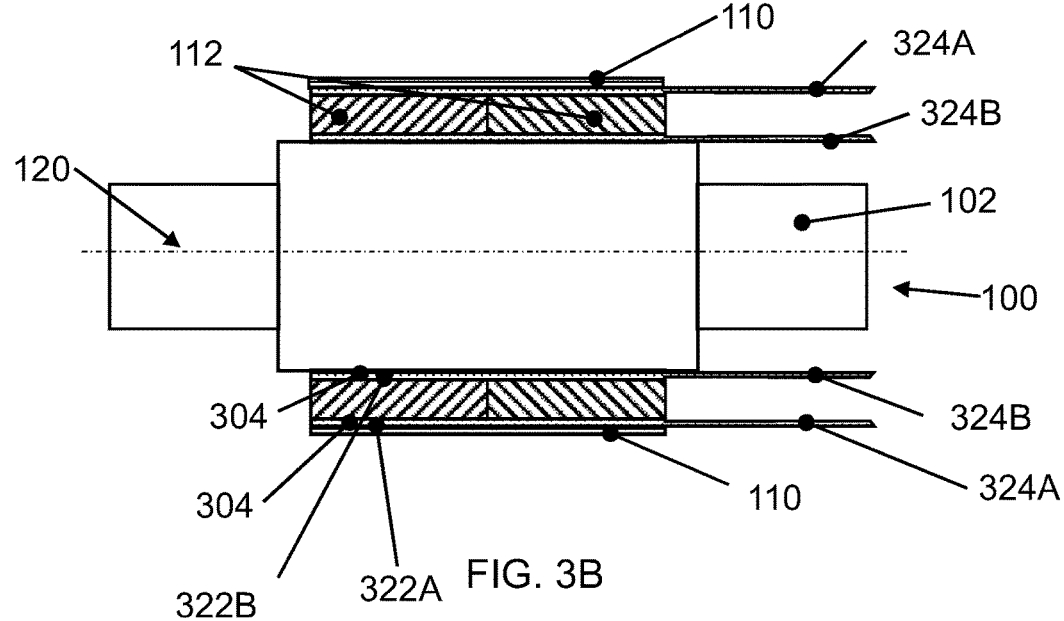
Figure 3C:
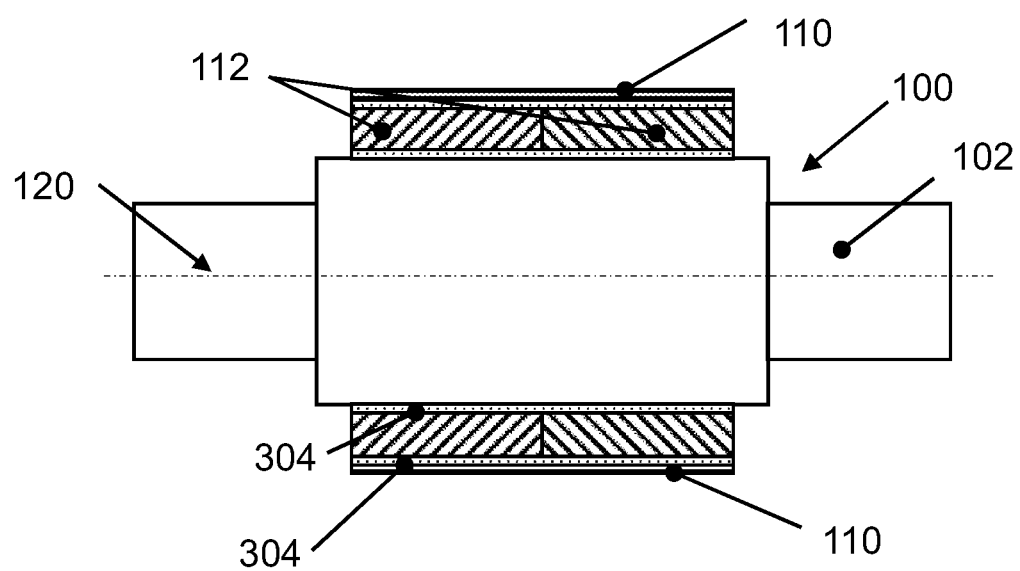

FIGS. 3A-3C illustrate steps of another implementation of the present method of prestressing a FRP sleeve 110 surrounding a permanent magnet rotor 100 (rotor) having at least one surface magnet 112. The permanent magnet rotor having a rotor shaft 102. The rotor and surface magnet may be concentric about a rotational axis 120.

FIG. 3A illustrates a first method step in which the FRP sleeve 110 is disposed to surround the permanent magnet rotor 100 and at least one surface magnet 112. The sleeve can be hollow and substantially concentric about the rotational axis. The sleeve can be comprised of fibers embedded in a plastic material. Typically, the fibers may be continuous. The FRP sleeve with rotor and magnets is disposed in a molding fixture 116 adapted to retain the FRP sleeve with rotor and magnets. The molding fixture 116 is designed to provide at least one circumferential gap 118 between the FRP sleeve 110 and the molding fixture 116 and at least two circumferential conduits 302A, 302B. Conduit 302A can provide access to a cavity 322A between the outer surface 236 of the surface magnets 112 and an inner surface 132 of the sleeve 110. Conduit 302B can provide access to a cavity 322B between an inner surface of the surface magnets 134 and the rotor 100.

Similar to that described above with respect to FIG. 1B, a second method step may be performed in which a molding compound 304 can be introduced into the molding fixture 116 through the conduits 302A, 302B by means of a defined mass flow ($\dot{m}$) under pressure (P) and temperature (T). The molding compound 304 can be a thermoplastic, thermosetting compound (such as a duroplastic compound), or other compound having desired thermal, chemical, and/or mechanical properties.

Similar to that described above with respect to FIG. 1C, a third method step may be performed in which the molding compound 304 advances through conduits 302A, 302B and fills cavity 322A, between the outer surface 236 of surface magnet 112 and the inner surface 132 of the sleeve 110 and cavity 322B between the inner surface 134 of the surface magnet 112 and the rotor 100.

Pressure P of the molding compound can urge magnets 112 and sleeve 110 outward, expanding the sleeve and reducing a width of gap 118. As such, expansion of the sleeve can pretension and apply a radial compressive force acting on surface magnet 112. In the prestressed state, hardening of the molding compound can occur under pressure P. In this way, the pretension may remain in the hardened state of the molding compound.

FIG. 3B illustrates a fourth method step in which the permanent magnet rotor 100 is removed from the molding fixture 116 and having protruding sprues 324A, 324B of the molding compound 304 in conduits 302A, 302B. FIG. 3C illustrates a fifth method step with the protruding sprues removed and the resultant permanent magnet rotor 100 with surface magnet 112 pretensioned by FRP sleeve 110 available for further process steps.

In addition to the exemplary embodiments shown, further advantageous configurations are contemplated. The molding compound may be formed optionally on end faces of the PM rotor, and/or on an outside surface of the FRP sleeve. The rotor shaft can optionally have a multi-groove profile and/or feather keyways and/or a toothing in order to provide a positive connection between the rotor shaft and the molding compound and/or surface magnet. The torque transmission can optionally also be accomplished by, for example, a non-positive connection, such as a force fit, between the rotor shaft and the molding compound and/or the surface magnet. Force fits, for example, are designed to maintain a controlled pressure between mating parts, such as between the rotor shaft and the molding compound and/or the surface magnet, and may be used where forces or torques are being transmitted through the joining point. Force fits are typically achieved by applying a force during component assembly. Alternatively, the torque transmission can optionally be accomplished by one or more combinations of positive and non-positive connections between the rotor shaft and the molding compound and/or the surface magnet.

The rotor shaft can comprise a metallic material.

In any of the embodiments, the pretensoned sleeve can be impregnated with a matrix material. Examples of suitable matrix materials include thermoplastic and thermosetting compounds, such as epoxy (EP), bismaleimide, polyester, vinyl-ester, ceramic, carbon, cyanate ester (CE), polypropylene (PP), polyamide (PA), acrylonitrile butadiene styrene (ABS), polyethylene imine (PEI), polyphthalamide (PPA), polyphenylene sulfide (PPS), polyaryletherketone (PAEK), polyetherketoneketone (PEKK), and polyetheretherketone (PEEK), and other such materials.

Other embodiments are within the scope of the following claims.

The invention claimed is:

1. A method of pretensioning a fiber-reinforced plastic (FRP) sleeve surrounding an assembly, comprising:
    disposing the assembly within the FRP sleeve, the assembly having at least two parts;
    introducing a molding compound into at least one portion within the FRP sleeve to urge one of the at least two parts of the assembly toward an inner surface of the FRP sleeve, the molding compound introduced at a desired first pressure (P), first temperature (T), and first mass flow ($\dot{m}$); and pretensioning the FRP sleeve by hardening the molding compound while maintaining the first pressure.

2. The method as claimed in claim 1, wherein the assembly is a permanent magnet (PM) rotor and the at least two parts are a surface magnet mounted on a rotor and concentric with an axis of rotation of the rotor.

3. The method as claimed in claim 2, wherein the at least one portion within the FRP sleeve is a first cavity to receive the molding compound, the first cavity being circumferential and located between the PM rotor and an inner surface of the surface magnet.

4. The method as claimed in claim 2, comprising:
    wherein another portion within the FRP sleeve is a second cavity that is circumferential and located between the surface magnet and the FRP sleeve; and
    introducing the molding compound into the second cavity to urge away an inner surface of the FRP sleeve from one of the at least two parts of the assembly the molding compound introduced at a desired second pressure (P), second temperature (T), and second mass flow ($\dot{m}$); and
    hardening the molding compound while maintaining the second pressure.

5. The method as claimed in claim 2, wherein the at least one portion within the FRP sleeve is a first cavity to receive the molding compound, the first cavity being circumferential and located between an outer surface of the surface magnet and an inner surface of the FRP sleeve.

6. The method as claimed in claim 2, wherein the pretension is sufficient to oppose a rotational force on the surface magnet based on a rotational speed of the PM rotor.

7. A method of pretensioning a fiber-reinforced plastic (FRP) sleeve surrounding an assembly, comprising:
    disposing the assembly within the FRP sleeve, the assembly having at least two parts;
    disposing the assembly and FRP sleeve in a fixture, the fixture configured to provide a conduit to at least one portion within the FRP sleeve and configured to provide a circumferential gap between the sleeve and fixture prior to introduction of a molding compound;

introducing the molding compound into the at least one portion within the FRP sleeve to urge one of the at least two parts of the assembly toward an inner surface of the FRP sleeve, the molding compound introduced at a desired first pressure (P), first temperature (T), and first mass flow ($\dot{m}$); and pretensioning the FRP sleeve by hardening the molding compound while maintaining the first pressure;

removing the assembly from the fixture after hardening of the molding compound; and detaching a sprue from the at least one portion.

8. A method of pretensioning a fiber-reinforced plastic (FRP) sleeve surrounding an assembly, comprising:

disposing the assembly within the FRP sleeve, the assembly having at least two parts;

wherein the assembly is a permanent magnet (PM) rotor and the at least two parts are a surface magnet mounted on a rotor and concentric with an axis of rotation of the rotor;

wherein a portion within the FRP sleeve is a first cavity and another portion within the FRP sleeve is a second cavity that is circumferential and located between the surface magnet and the FRP sleeve; and disposing the assembly and FRP sleeve in a fixture, the fixture configured to provide a first conduit to the first cavity and a second conduit to the second cavity and comprising a circumferential gap between the FRP sleeve and fixture prior to introduction of a molding compound;

introducing the molding compound into the first cavity within the FRP sleeve to urge one of the at least two parts of the assembly toward an inner surface of the FRP sleeve, the molding compound introduced at a desired first pressure (P), first temperature (T), and first mass flow ($\dot{m}$); and pretensioning the FRP sleeve by hardening the molding compound while maintaining the first pressure;

introducing the molding compound into the second cavity to urge away an inner surface of the FRP sleeve from one of the at least two parts of the assembly, the molding compound introduced at a desired second pressure (P), second temperature (T), and second mass flow ($\dot{m}$); and hardening the molding compound while maintaining the second pressure;

removing the assembly from the fixture after hardening of the molding compound;

detaching a first sprue from the first cavity; and detaching a second sprue from the second cavity, wherein the pretension is sufficient to oppose a rotational force on the surface magnet based on a rotational speed of the PM rotor.

9. The method as claimed in claim 1, wherein the molding compound is selected from the group consisting of thermoplastic and thermosetting plastic.

10. The method as claimed in claim 1, wherein the molding compound is selected from the group consisting of unreinforced, short fiber reinforced, and long fiber reinforced molding compounds, and combinations thereof.

11. The method as claimed in claim 1, wherein the molding compound is introduced by a process selected from the group consisting of injection molding and resin injection.

12. The method according to claim 2, wherein torque is transmitted from the surface magnet to a shaft of the rotor by a method selected from the group consisting of: a force fit, a positive connection, and combinations thereof between the rotor shaft and at least one surface magnet or molding compound.

13. The method as claimed in claim 1, wherein the FRP sleeve has a wall thickness between 0.1 mm to 2 mm.

14. The method as claimed in claim 1, wherein the FRP sleeve has a fiber volume content of 50% to 75%.

15. The method as claimed in claim 1, wherein the FRP sleeve comprises a matrix material with continuous fibers being arranged at an angle of 80 degrees to 90 degrees to a longitudinal axis of the sleeve.

16. The method as claimed in claim 12, wherein the rotor shaft comprises a metallic material.

17. The method as claimed in claim 2, wherein the molding compound is disposed on additional portions of the assembly selected from the group consisting of: end faces of the assembly, above the surface magnet, below the surface magnet, and on an outside surface of the FRP sleeve.

* * * * *